United States Patent
Zhang et al.

(10) Patent No.: US 10,556,497 B2
(45) Date of Patent: Feb. 11, 2020

(54) SYSTEM AND METHOD FOR ADJUSTING BATTERY STATE OF CHARGE PARAMETERS

(71) Applicant: Ford Global Technologies, LLC, Dearborn, MI (US)

(72) Inventors: Chen Zhang, Canton, MI (US); Yanan Zhao, Ann Arbor, MI (US); Mark Steven Yamazaki, Canton, MI (US); Ming Lang Kuang, Canton, MI (US); Mark Davison, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 365 days.

(21) Appl. No.: 15/604,847

(22) Filed: May 25, 2017

(65) Prior Publication Data

US 2018/0339694 A1 Nov. 29, 2018

(51) Int. Cl.
| | |
|---|---|
| *B60K 6/48* | (2007.10) |
| *B60W 10/08* | (2006.01) |
| *B60W 10/26* | (2006.01) |
| *B60W 20/13* | (2016.01) |
| *B60W 20/00* | (2016.01) |

(52) U.S. Cl.
CPC .............. *B60K 6/48* (2013.01); *B60W 10/08* (2013.01); *B60W 10/26* (2013.01); *B60W 20/00* (2013.01); *B60W 20/13* (2016.01); *B60L 2240/12* (2013.01); *B60W 2520/10* (2013.01); *B60W 2710/244* (2013.01); *Y10S 903/903* (2013.01)

(58) Field of Classification Search
CPC ......... B60K 6/48; B60W 20/13; B60W 10/26; B60W 10/08; B60W 2710/244; B60W 2520/10; Y10S 903/903; B60L 2240/12
See application file for complete search history.

(56) References Cited

U.S. PATENT DOCUMENTS

| | | | |
|---|---|---|---|
| 8,260,481 B2 | 9/2012 | Naik et al. | |
| 9,346,466 B2 | 5/2016 | Papajewski et al. | |
| 2002/0188387 A1* | 12/2002 | Woestman | B60L 58/22 701/22 |
| 2010/0305798 A1 | 12/2010 | Phillips et al. | |
| 2015/0344036 A1 | 12/2015 | Kristinsson et al. | |
| 2016/0121891 A1* | 5/2016 | Kim | B60W 30/18 701/96 |
| 2016/0325726 A1 | 11/2016 | Liang et al. | |
| 2017/0355358 A1* | 12/2017 | Ogawa | B60W 10/00 |

FOREIGN PATENT DOCUMENTS

EP 2857271 A2 4/2015

* cited by examiner

*Primary Examiner* — Jeffrey C Boomer
(74) *Attorney, Agent, or Firm* — David Kelley; Brooks Kushman, P.C.

(57) ABSTRACT

A hybrid powertrain includes a traction battery and a controller. The controller is programmed to, responsive to a current vehicle speed exceeding a first threshold, reduce a parameter indicative of state of charge (SOC) of the battery by an offset amount that varies with an amount of predicted distance for which a predicted vehicle speed profile is less than a second threshold to prompt charging of the battery to increased SOC values.

10 Claims, 4 Drawing Sheets

SYSTEM AND METHOD FOR ADJUSTING BATTERY STATE OF CHARGE PARAMETERS

TECHNICAL FIELD

The present disclosure relates to hybrid-electric vehicles and more specifically to controls for adjusting battery state of charge.

BACKGROUND

A hybrid-electric powertrain includes an engine and an electric machine. The torque (or power) produced by the engine and/or the electric machine can be transferred through a transmission to the driven wheels to propel the vehicle. A traction battery supplies energy to the electric machine.

SUMMARY

According to one embodiment, a hybrid powertrain includes a traction battery and a controller. The controller is programmed to, responsive to a current vehicle speed exceeding a first threshold, reduce a parameter indicative of state of charge (SOC) of the battery by an offset amount that varies with an amount of predicted distance for which a predicted vehicle speed profile is less than a second threshold to prompt charging of the battery to increased SOC values.

According to another embodiment, a method of precharging a traction battery includes, responsive to a current vehicle speed exceeding a first threshold, reducing a parameter indicative of state of charge (SOC) of the battery by an offset amount that varies with an amount of predicted distance for which a predicted vehicle speed profile is less than a second threshold to prompt charging of the battery to increased SOC values.

According to yet another embodiment, a vehicle includes a traction battery and a controller. The controller is programmed to, responsive to a current vehicle speed exceeding a first threshold, reduce a parameter indicative of state of charge (SOC) of the battery by an offset amount that varies with an amount of predicted time for which a predicted vehicle speed profile is less than a second threshold to prompt charging of the battery to increased SOC values.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
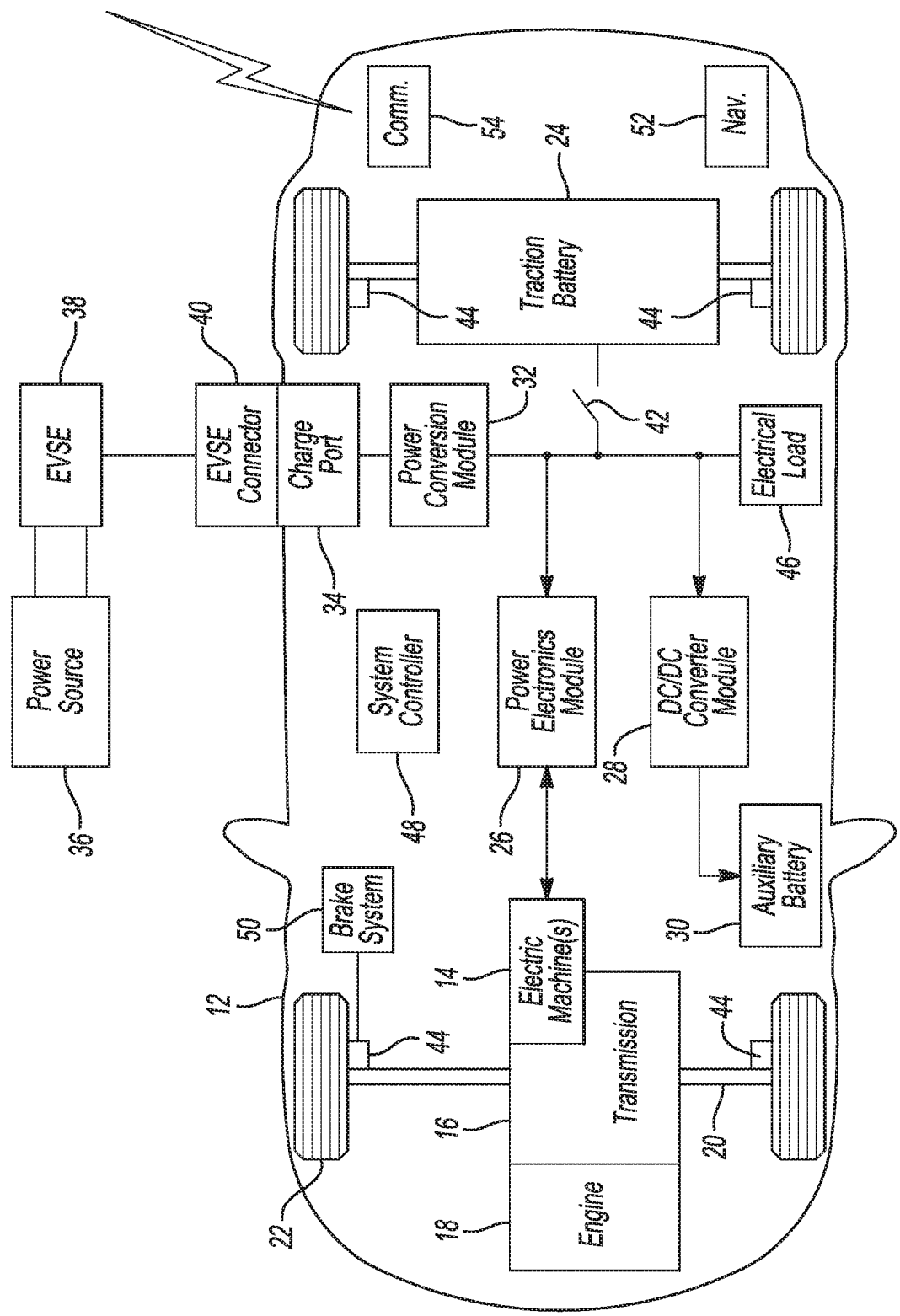
FIG. 1 is a schematic diagram of an example hybrid-electric vehicle.

FIG. 1 depicts a plug-in hybrid-electric vehicle (PHEV) 12, but this disclosure is not limited to a PHEV. The vehicle 12 may include one or more electric machines 14 mechanically coupled to a hybrid transmission 16. The electric machines 14 may be capable of operating as a motor or a generator. In addition, the hybrid transmission 16 is mechanically coupled to an engine 18. The hybrid transmission 16 is also mechanically coupled to a driveshaft 20 that is mechanically coupled to the wheels 22. The electric machines 14 can provide propulsion and deceleration capability when the engine 18 is turned ON or OFF. The electric machines 14 also act as generators and can provide fuel economy benefits by recovering energy that would normally be lost as heat in a friction braking system. The electric machines 14 may also reduce vehicle emissions by allowing the engine 18 to operate at more efficient speeds and allowing the hybrid-electric vehicle 12 to be operated in electric mode with the engine 18 OFF under certain conditions.

A traction battery or battery pack 24 stores energy that can be used by the electric machines 14. The vehicle battery 24 typically provides a high-voltage DC output. The traction battery 24 is electrically coupled to one or more power electronics modules. One or more contactors 42 may isolate the traction battery 24 from other components when opened and connect the traction battery 24 to other components when closed. The power electronics module 26 is also electrically coupled to the electric machines 14 and provides the ability to bi-directionally transfer energy between the traction battery 24 and the electric machines 14. For example, a traction battery 24 may provide a DC voltage while the electric machines 14 may operate with a three-phase AC current to function. The power electronics module 26 may convert the DC voltage to a three-phase AC current to operate the electric machines 14. In a regenerative mode, the power electronics module 26 may convert the three-phase AC current from the electric machines 14 acting as generators to the DC voltage compatible with the traction battery 24.

In addition to providing energy for propulsion, the traction battery 24 may provide energy for other vehicle electrical systems. A vehicle 12 may include a DC/DC converter module 28 that converts the high voltage DC output of the traction battery 24 to a low voltage DC supply that is compatible with low-voltage vehicle loads. An output of the DC/DC converter module 28 may be electrically coupled to an auxiliary battery 30 (e.g., 12V battery). The low-voltage systems may be electrically coupled to the auxiliary battery.

Other high-voltage loads 46, such as compressors and electric heaters, may be coupled to the high-voltage output of the traction battery 24.

The vehicle 12 may be a plug-in hybrid vehicle in which the traction battery 24 may be recharged by an external power source 36. The external power source 36 may be a connection to an electrical outlet. The external power source 36 may be electrically coupled to a charger or electric vehicle supply equipment (EVSE) 38. The external power source 36 may be an electrical power distribution network or grid as provided by an electric utility company. The EVSE 38 may provide circuitry and controls to regulate and manage the transfer of energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically coupled to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34. Alternatively, various components described as being electrically coupled or connected may transfer power using a wireless inductive coupling.

One or more wheel brakes 44 may be provided for decelerating the vehicle 12 and preventing motion of the vehicle 12. The wheel brakes 44 may be hydraulically actuated, electrically actuated, or some combination thereof. The wheel brakes 44 may be a part of a brake system 50. The brake system 50 may include other components to operate the wheel brakes 44. For simplicity, the figure depicts a single connection between the brake system 50 and one of the wheel brakes 44. A connection between the brake system 50 and the other wheel brakes 44 is implied. The brake system 50 may include a controller to monitor and coordinate the brake system 50. The brake system 50 may monitor the brake components and control the wheel brakes 44 for vehicle deceleration. The brake system 50 may respond to driver commands and may also operate autonomously to implement features such as stability control. The controller of the brake system 50 may implement a method of applying a requested brake force when requested by another controller or sub-function.

One or more electrical loads 46 may be coupled to the high-voltage bus. The electrical loads 46 may have an associated controller that operates and controls the electrical loads 46 when appropriate. Examples of electrical loads 46 may be a heating module or an air-conditioning module.

Electronic modules in the vehicle 12 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 30. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1 but it may be implied that the vehicle network may connect to any electronic module that is present in the vehicle 12. A vehicle system controller (VSC) 48 may be present to coordinate the operation of the various components.

Figure 2:
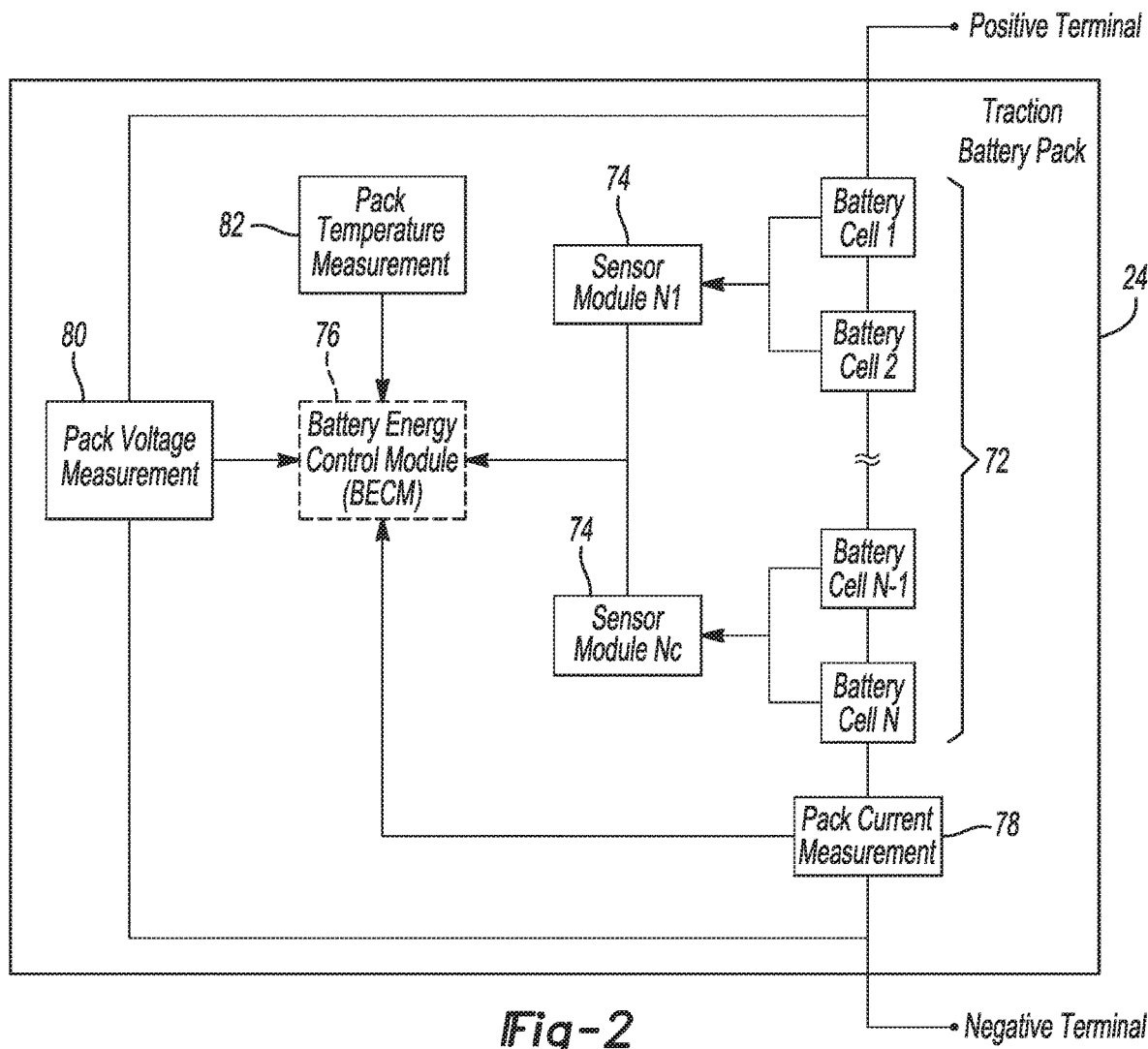
FIG. 2 is a diagram of an example traction battery.

The traction battery 24 may be constructed from a variety of chemical formulations. Typical battery pack chemistries include: lead acid, nickel-metal hydride (NIMH), and Lithium-Ion. FIG. 2 shows an example traction battery pack 24 in a simple series configuration of N battery cells 72. Other battery packs, however, may be composed of any number of individual battery cells connected in series or parallel or some combination thereof. A battery management system may have one or more controllers, such as a Battery Energy Control Module (BECM) 76, that monitor and control the performance of the traction battery 24. The battery pack 24 may include sensors to measure various pack level characteristics. The battery pack 24 may include one or more pack current measurement sensors 78, pack voltage measurement sensors 80, and pack temperature measurement sensors 82. The BECM 76 may include circuitry to interface with the pack current sensors 78, the pack voltage sensors 80 and the pack temperature sensors 82. The BECM 76 may have non-volatile memory such that data may be retained when the BECM 76 is in an OFF condition. Retained data may be available upon the next key cycle.

In addition to the pack level characteristics, there may be battery cell 72 level characteristics that are measured and monitored. For example, the terminal voltage, current, and temperature of each cell 72 may be measured. A system may use a sensor module 74 to measure the battery cell 72 characteristics. Depending on the capabilities, the sensor module 74 may measure the characteristics of one or multiple of the battery cells 72. The battery pack 24 may utilize up to $N_c$ sensor modules 74 to measure the characteristics of all the battery cells 72. Each sensor module 74 may transfer the measurements to the BECM 76 for further processing and coordination. The sensor module 74 may transfer signals in analog or digital form to the BECM 76. In some configurations, the sensor module 74 functionality may be incorporated internally to the BECM 76. That is, the sensor module 74 hardware may be integrated as part of the circuitry in the BECM 76 and the BECM 76 may handle the processing of raw signals. The BECM 76 may also include circuitry to interface with the one or more contactors 42 to open and close the contactors 42.

It may be useful to calculate various characteristics of the battery pack. Quantities such a battery power capability and battery state of charge (SOC) may be useful for controlling the operation of the traction battery 24 as well as any electrical loads receiving power from the battery. Battery power capability is a measure of the maximum amount of power the battery can provide or the maximum amount of power that the battery can receive. Knowing the battery power capability allows the electrical loads to be managed so that the power requested is within limits that the battery can handle.

Battery pack SOC gives an indication of how much charge remains in the battery. The SOC may be expressed as a percentage of the total charge remaining in the battery pack. The battery SOC may be output to inform the driver of how much charge remains in the battery, similar to a fuel gauge. The battery SOC may also be used to control the operation of an electric or hybrid-electric vehicle. Calculation of battery SOC can be accomplished by a variety of methods. One possible method of calculating battery SOC is to perform an integration of the battery current over time. This is well-known in the art as ampere-hour integration.

Referring back to FIG. 1, the vehicle 12 may include a navigation module 52 that provides routing information to the operator. The navigation module 52 may include a vehicle position sensor compatible with a Global Positioning System (GPS): The navigation module 52 may include a display for displaying map and route information. The display may be a touchscreen that is used to input information to the navigation module 52. The operator may input a destination or select a destination from memory. The navigation module 52 may output the vehicle position to other modules. The navigation module 52 may also output route information to other modules.

The vehicle 12 may include a wireless communications module 54 to communicate with devices and systems remote from the vehicle 12. The wireless communications module 54 may include an onboard modem having an antenna to communicate with off-board devices or systems. The wireless communications module 54 may be a cellular communications device to enable communications via a cellular data network. The wireless communications module 54 may be a wireless local area network (LAN) device compatible with IEEE 802.11 family of standards (i.e., WiFi) or a WiMax network. The wireless communications module 54 may include a vehicle based wireless router to allow connection to remote networks in range of a local router. The wireless communications module 54 may interface with one or more controllers in the vehicle 12 to provide data. For example, the data may include traffic and construction data, routing instructions, and weather data. The data received via the wireless communications module 54 may be utilized by the navigation module 52 in determining a route for the vehicle 12.

Figure 3:
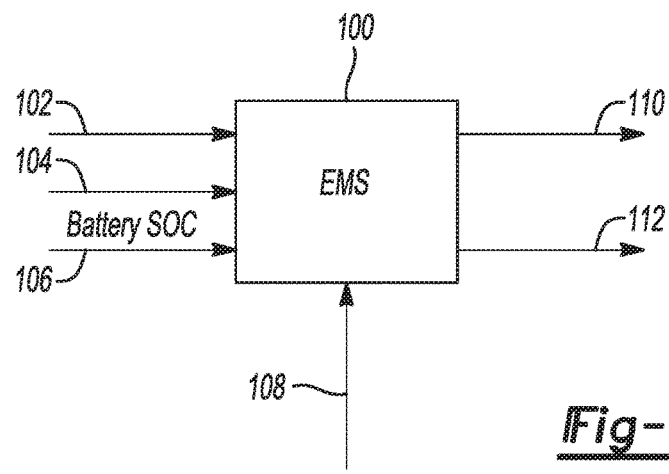
FIG. 3 is a system diagram for an energy management system.

Referring to FIG. 3, an energy management system (EMS) 100 may operate the powertrain of the vehicle to minimize fuel consumption. The powertrain may include the engine, the transmission, the electric machines and associated power electronics module, and the traction battery. The EMS 100 may determine an operating state for the engine and the electric machines to minimize fuel consumption of the engine. The functions of the EMS 100 may be incorporated into one or more controllers such as the VSC 48.

The EMS 100 may receive inputs such as driver-demanded torque 102, engine speed 104, battery SOC 106, and battery power limits 108. Based on these inputs, the EMS 100 is programmed to output an engine ON/OFF command 110 and an energy-management torque command 112. The powertrain of the vehicle is controlled according to outputs 110 and 112 as well as other parameters.

Figure 4:
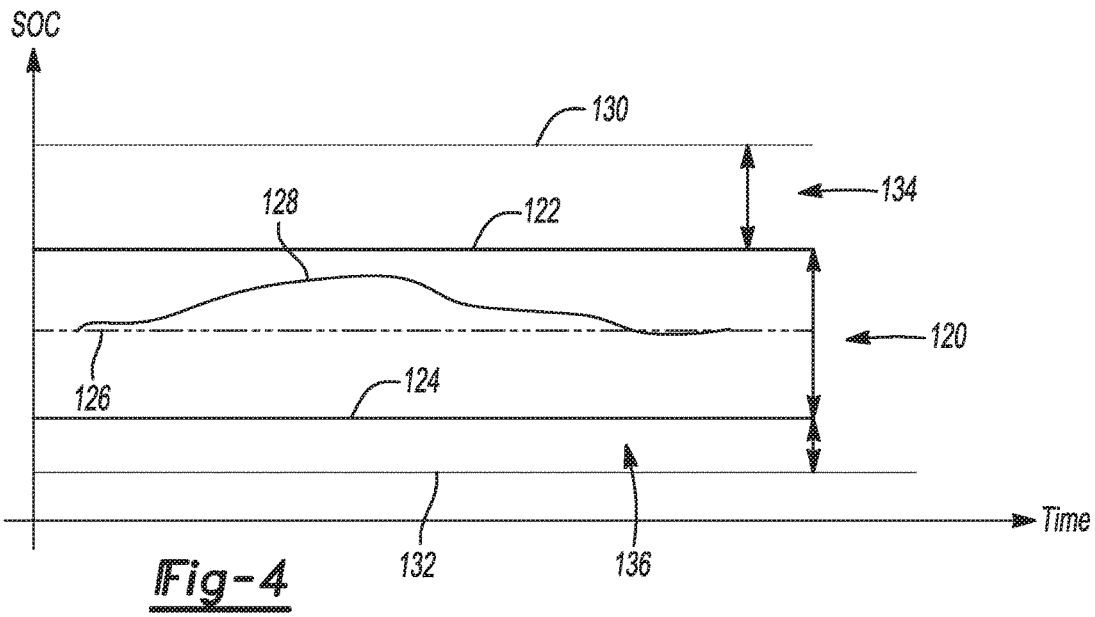
FIG. 4 is a plot illustrating a battery state of charge parameters and actual state of charge of the battery for a time window.

Referring to FIG. 4, the controller 48 may a have a base operating window 120 for the battery SOC. The window 120 includes an upper limit 122, a lower limit 124, and a neutral state of charge (NSOC) 126. The NSOC 126 may be the median value of the window 120. In the illustrated example, the upper limit is 60% SOC, the lower limit is 40% SOC, and the NSOC is 50% SOC, but other values are contemplated. The NSOC 126 is a baseline SOC for the battery, but as shown in FIG. 4, the actual SOC 128 fluctuates above and below the NSOC 126 between the upper and lower limits 122, 124 based on operating conditions of the vehicle.

The traction battery 24 may also have a maximum SOC 130 and a minimum SOC 132. An upper operating window 134 is defined between the maximum SOC 130 and the upper limit 122, and a lower operating window 136 defined between the minimum SOC 132 and the lower limit 124. In a limited set of conditions, the controller 48 allows the battery SOC to enter the upper and lower windows. For example, the controller 48 may allow the battery SOC to enter the lower window 136 in order to start the engine or enter the upper window 134 to pre-charge the traction battery 24.

To increase electric range of the vehicle 12, the battery 24 may be pre-charged to a higher SOC when it is predicted that electric propulsion of the vehicle is desirable in the near future. For example, the battery 24 may be pre-charged if a traffic jam is detected in front of the vehicle. The pre-charging may take place when battery charging is efficient, e.g., engine ON and vehicle above 30 miles per hour (mph). The battery may be pre-charged by shifting the base NSOC 120 to higher battery SOC to encourage battery charging by the EMS 100. For example, the window 120 could be shifted so that the upper limit is 70% SOC, the lower limit is 50% SOC, and the NSOC is 60% SOC. The NS OC of the shifted window may be referred to as an adjusted NSOC. The amount of adjustment may be a dynamic value that is based current and predicted operating conditions of the vehicle as opposed to a predefined value. The above percentages are merely illustrative.

Control logic or functions performed by controller 48 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 48. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

Figure 5:
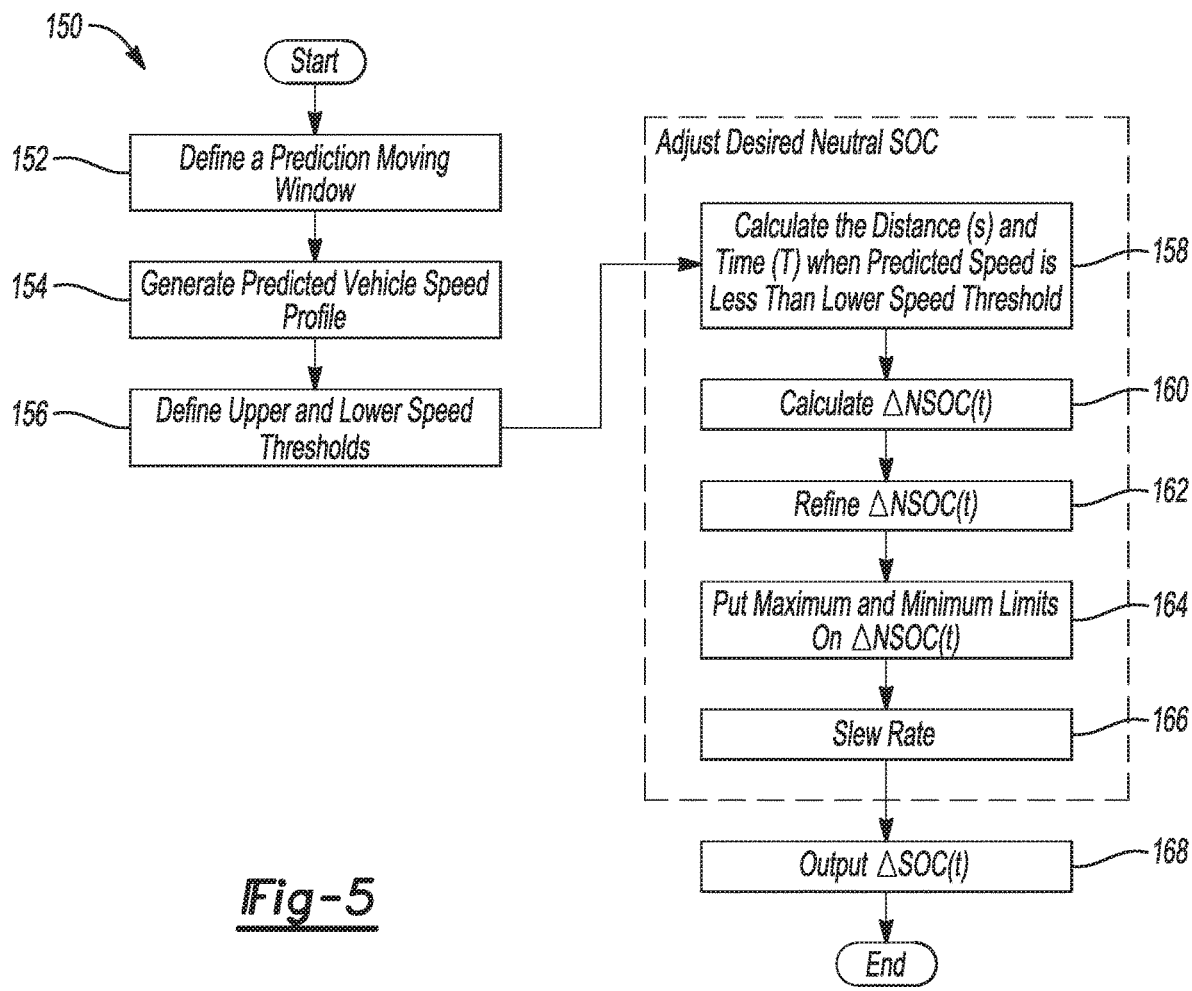
FIG. 5 is a flow chart illustrating an algorithm for calculating a neutral state of charge adjustment.
Figure 6:
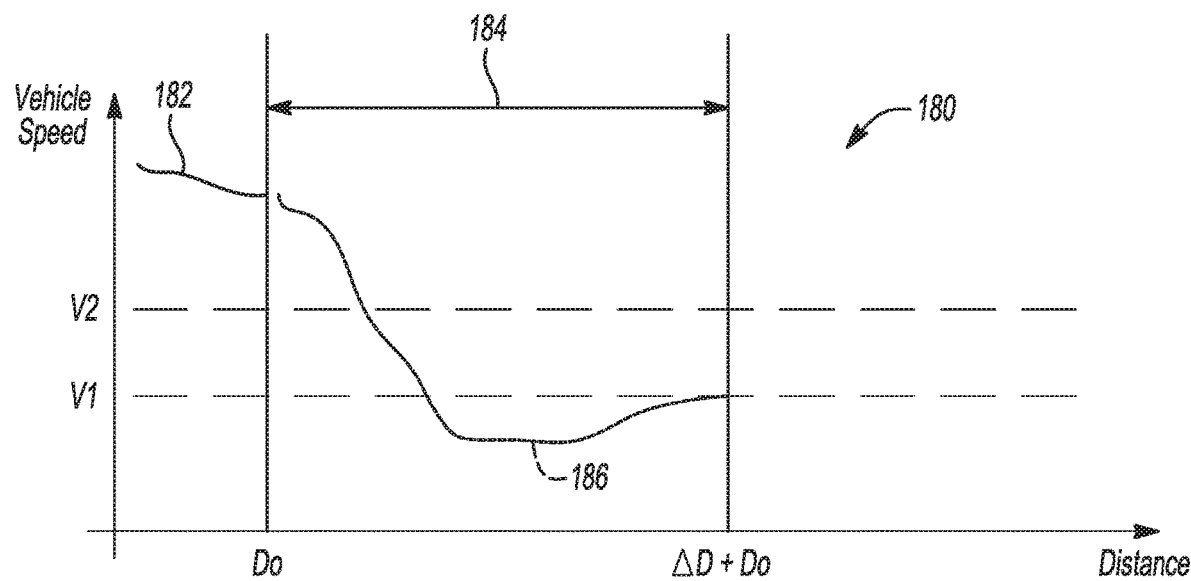
FIG. 6 is a plot illustrating actual and predicted future vehicle speeds for a portion of a vehicle drive cycle.

FIG. 5 is a flowchart 150 of an algorithm for adjusting the NSOC in order to pre-charge the traction battery 24. At operation 152, the controller 48 defines a predictive moving window 184 for the vehicle 12. FIG. 6 illustrates the moving window 184 for the vehicle 12 during a hypothetical driving cycle 180. In this example, the x-axis is distance, but in other embodiments, the x-axis may be time. $D_0$ represents the current vehicle position and trace 182 shows the actual past speeds of the vehicle 12. The moving window 184 is a distance ($\Delta D$), or time in other embodiments, in front of the vehicle in which future vehicle operations, such as speed, can be accurately predicted. The size of the window 184 may be predefined or may be based on the amount of information available at each time, such as map data, traffic data, vehicle-history data, and the like. At operation 154, the controller generates a predicted future speed profile 186 of the vehicle 12 for the moving window 184. The speed profile 186 may be calculated using map data, traffic data, speed-limit data, vehicle-history data, and the like. The communication module 54 and the navigation module 52, as well as other vehicle modules, may be used to create the window 184 and the speed profile 186. At operation 156, the controller defines upper (V2) and lower (V1) vehicle-speed thresholds. Vehicle speeds at and above the upper threshold V2 are speeds corresponding to efficient battery charging, and vehicle speeds at and below the lower threshold V1 are speeds corresponding to efficient electric propulsion. The actual values for V1 and V2 will vary depending upon the specific design of the hybrid powertrain, such as motor/generator power and battery size, but for illustrative purposes, V1 may be 15 mph and V2 may be 30 mph.

To improve electric range of the vehicle, the battery 24 may be pre-charged based on the distance and/or time that the predicted future speed 186 is above V2 and based on the distance and/or time that the predicted future speed 186 is below V1. The pre-charging of the battery 24 may be effectuated by increasing the NSOC to an adjusted NSOC. Adjusting the NSOC to an increased value causes the EMS 100 to charge the battery 24 more often and to a higher SOC than when the NSOC is at the base value. The amount of adjustment is calculated by the controller 48 in operations 158-166.

At operation 158, the controller calculates for each time step (t) the accumulated distance (s(t)) and time (T(t)) that the predicted future speed profile 186 is at or below V1 for the window 184. This represents the distance and time that the vehicle 10 is predicted to be utilizing at least some electric propulsion. At operation 160, the controller 48 calculates a desired battery NSOC adjustment (ΔNSOC(t)) based on s(t) and T(t) calculated in operation 158. The controller 48 may use equation 1 to calculate ΔNSOC(t), where a, b, and c are calibratable coefficients that account for variables such as accessory loads and the like. The ΔNSOC(t) value may increase as S(t) and T(t) increase and may decrease as S(t) and T(t) deceases. If the profile 186 is completely above V1, then ΔNSOC(t) may be set to zero.

$$\Delta NSOC(t) = a*s(t) + b*T(t) + c \quad \text{(Eq. 1)}$$

The battery 24 may only be pre-charged if the vehicle speed is predicted to be above V2 in the window 184 because active battery charging may not be desirable due to potential inefficient operation when the vehicle is below V2. At operation 162, the controller 48 determines if the vehicle speed is predicted to be above V2 in the window 184. If no, ΔNSOC(t) is set to zero. If yes, ΔNSOC(t) for operation 160 is not modified. Equation 2 may be used in operation 162. Other factors may also be used to refine ΔNSOC(t). For example, ΔNSOC(t) may be set to zero if road grade exceeds a threshold value.

$$\Delta NSOC(t) = \begin{cases} a*s(t) + b*T(t) + c & \text{if vehicle speed} > v2 \\ 0 & \text{if else} \end{cases} \quad \text{(Eq. 2)}$$

The battery 24 has maximum and minimum SOC limits that are set based on physical constraints of the battery and the other components of the high-voltage system. The maximum and minimum SOC limits may be a predefined value. The controller 48 determines if adjusting the baseline NSOC by ΔNSOC(t), from operation 162, would place the adjusted NSOC outside the minimum and maximum SOC limits at operation 164. If no, ΔNSOC(t) from operation 162 is passed through. If ΔNSOC(t) exceeds the maximum SOC limit, then ΔNSOC(t) is reduced so that the adjusted SOC is below the maximum SOC limit.

To provide a smooth transition when adjusting the NSOC, one or more slew rates may be used to transition between the baseline NSOC to the adjusted NSOC and between different adjusted NSOCs. Different slew rates may be used for different types of transitions and for transitions of different magnitudes. For example, a first slew rate may be used when shifting from the baseline NSOC to the adjusted NSOC and a second slew rate may be used when shifting from the adjusted NSOC to the baseline NSOC. Different slew rates may also be used depending upon if the NSOC is being increased or decreased. The various rates may be predetermined values that are stored in one or more look up tables or may be dynamic values that change based on operating conditions such as vehicle speed. At operation 166, the controller calculates the slew rates for the various transitions within the window 184 and may reduce the ΔNSOC(t) value at each time step to a value set by the slew rate.

Equations 3 or 4 may be used to determine the slew rate. Equation 3 is in the spatial domain and the equation 4 is in the time domain. Where, v(t) is the vehicle velocity at time t; $k_1$ is maximum slew rate; $-k_2$ is minimum slew rate when the vehicle velocity is greater than v2; $-k_3$ is minimum slew rate when the vehicle velocity is between v1 and v2; and $-k_4$ is minimum slew rate when the vehicle velocity is less than v1.

$$\frac{d(\Delta SOC_n(t))}{ds} : \begin{cases} \leq k_1 & \text{in general} \\ \geq -k_2 & \text{if } v(t) > v2 \\ \geq -k_3 & \text{if } v(t) \leq v_2 \text{ and } v(t) \geq v_1 \\ \geq -k_4 & \text{if } v(t) < v_1 \end{cases} \quad \text{(Eq. 3)}$$

$$\frac{d(\Delta SOC_n(t))}{dt} : \begin{cases} \leq v(t)k_1 & \text{in general} \\ \geq -v(t)k_2 & \text{if } v(t) > v2 \\ \geq -v(t)k_3 & \text{if } v(t) \leq v_2 \text{ and } v(t) \geq v_1 \\ \geq -v(t)k_4 & \text{if } v(t) < v_1 \end{cases} \quad \text{(Eq. 4)}$$

At operation 168, an NSOC adjustment (ΔNSOC(t)) is output. The ΔNSOC(t) may be thought of as an offset that is used to reduce a parameter indicative of state of charge (SOC) creating an artificially low SOC value. The artificially low SOC value may be output to the EMS 100 to encourage charging of the battery.

Figure 7:
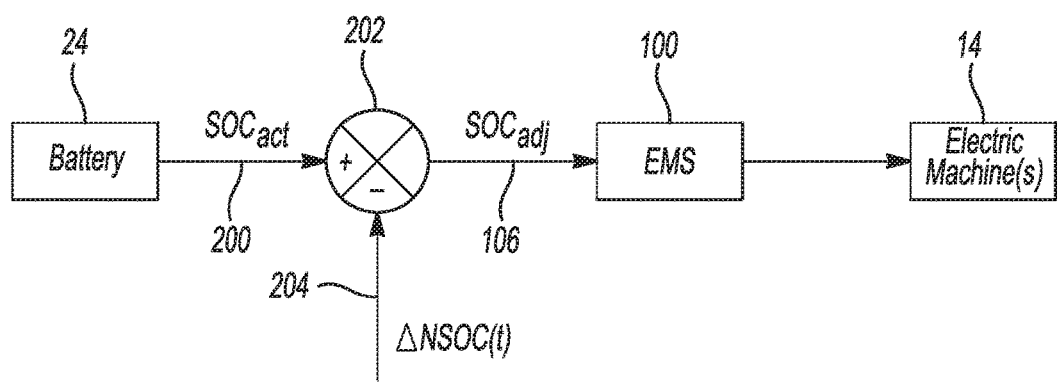
FIG. 7 is a control diagram for adjusting a parameter indicative of state of charge of the battery.

Referring to FIG. 7, the controller calculates an actual state of charge ($SOC_{act}$) 200 of the battery 24, which is feed to a difference element 202. The ΔNSOC(t) 204 from operation 168 is also feed to the difference element 202, and the ΔNSOC(t) 204 is subtracted from the $SOC_{act}$ 200. An adjusted SOC ($SOC_{adj}$) 106 is output from the difference element 202 and is fed to the EMS 100. The ($SOC_{adj}$) has an artificially low magnitude, which causes the EMS 100 to perceive the battery SOC as being lower than it actually is. Thus, the EMS 100 commands charging of the battery more often and to a higher battery SOC than would normally occur under the base energy management strategy. Referring back to FIG. 3, in response to receiving the artificially low battery SOC input 106, the EMS 100 outputs, over time, an increased energy-management torque command 112 to the electric machines. This causes the electric machines to output additional power to the battery 24 to pre-charge the battery.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A hybrid powertrain comprising:
   an electric machine;
   a traction battery configured to power the electric machine; and
   a controller having associated memory that includes a neutral state of charge (NSOC), the controller being programmed to,
   generate, for a specific future window of time, a predicted future vehicle speed profile having upper and lower speed thresholds,
   determine an actual state of charge (SOC) of the traction battery,
   calculate an adjusted NSOC based on an amount of predicted distance or an amount of predicted time for which the vehicle speed profile is less than the lower speed threshold, wherein the adjusted NSOC is zero when the vehicle speed profile is not less than the lower speed threshold during the window and is zero when the vehicle speed profile does not exceed the upper threshold during the window,
   calculate an adjusted battery SOC by subtracting the adjusted NSOC from the actual SOC, and
   command a negative torque to the electric machine to charge the battery based on the adjusted battery SOC, which is artificially low when the adjusted NSOC is greater than zero to encourage charging of the battery in excess of the NSOC to pre-charge the battery.

2. The hybrid powertrain of claim 1, wherein the adjusted NSOC is based on both the amount of predicted distance and the amount of predicted time.

3. The hybrid powertrain of claim 1, wherein the adjusted NSOC is based on the amount of predicted distance.

4. The hybrid powertrain of claim 3, wherein the adjusted NSOC increases in response to the amount of the predicted distance increasing.

5. The hybrid powertrain of claim 4, wherein the adjusted NSOC decreases in response to the amount of the predicted distance decreasing.

6. The hybrid powertrain of claim 1, wherein the adjusted NSOC is limited by a slew rate that is based on the predicted vehicle speed profile.

7. A method of pre-charging a traction battery comprising:
   via a controller having associated memory that includes a preprogrammed neutral state of charge (NSOC) for a traction battery:
   generating, for a specific future window of time, a predicted future vehicle speed profile having upper and lower speed thresholds,
   determining an actual battery state of charge (SOC),
   calculating an adjusted NSOC based on an amount of predicted distance for which the vehicle speed profile is less than the lower speed threshold, wherein the adjusted NSOC is zero when the vehicle speed profile is not less than the lower speed threshold during the window and is zero when the vehicle speed profile does not exceed the upper threshold during the window,
   calculating an adjusted battery SOC by subtracting the adjusted NSOC from the actual SOC, and
   commanding a negative torque to the electric machine to charge the battery based on the adjusted battery SOC, which is artificially low when the adjusted NSOC is greater than zero to encourage charging of the battery in excess of the neutral SOC to pre-charge the battery.

8. The method of claim 7, wherein the adjusted NSOC is based on both the amount of predicted distance and an amount of predicted time for which the predicted vehicle speed profile is less than the second threshold.

9. The method of claim 7, wherein the adjusted NSOC increases in response to the amount of the predicted distance increasing.

10. The method of claim 7, wherein the adjusted NSOC decreases in response to the amount of the predicted distance decreasing.

* * * * *